United States Patent Office

2,803,609
Patented Aug. 20, 1957

2,803,609

ETHOXYLIN RESIN COMPOSITIONS AND PROCESS OF HARDENING SUCH RESINS

Felix Schlenker, Wiesbaden, Germany, assignor to Chemische Werke Albert, Wiesbaden-Biebrich, Germany, a corporation of Germany No Drawing. Application February 17, 1953,
Serial No. 337,430

Claims priority, application Germany March 27, 1952

21 Claims. (Cl. 260—47)

This invention relates to ethoxylin resins, to processes for hardening such resins and to compositions containing such resins in combination with certain hardening agents.

The curing of ethoxylin resins in the presence of various catalysts leading to the formation of infusible and insoluble products is known in the art. Numerous compounds, such as for example, alkali hydroxides, alkaline earth hydroxides, diethylamine, piperidine, triethanolamine, cyanamide and its polymerization products, polyamines of most varied character, phthalic acid anhydride, maleic acid anhydride and various derivatives thereof, and the like, have been suggested previously as curing catalysts.

The catalysts hitherto used for curing ethoxylin resins have several disadvantages. The main disadvantage of these catalysts is that, after once being added to the ethoxylin resin in solution or in the absence of a solvent, the products obtained are not consistently stable on storage, for the catalysts react with the resin and as a result the resin becomes difficultly soluble or it melts at too high temperatures. Furthermore, when a number of these catalysts are used, undesired discolorations of the resin can be observed, which limits the utilization of epoxy resins, particularly in the lacquer industry.

In accordance with the present invention, ethoxylin resin compositions are prepared with an addition of a polyvalent metal-organic salt drier. The drying material is generally of the class which may be further defined as salts of saturated or unsaturated higher molecular fatty acids and of resinic acids with the metals, as calcium, aluminum, zinc, cobalt, maganese, copper and lead. Suitable driers include the naphthenates, resinates, linoleates, oleates and phthalates and the corresponding divalent and higher valent metal salts of stearic and palmitic acids, and of synthetic acids derived from paraffin oil (including first fraction acids, middle fraction acids and the last run acids). Other examples include the similar salts of resin acids, of colophony acids, of abietic acid and of albertol acids (see K. Hultzsch, "Chemie der Phenolharze," published by Springer 1951, page 158) and rosin-maleic acid adducts.

Still other examples comprise salts of various acids included within the broad term "siccative" or "drying" acids as of benzoic acid, ethyl-hexyl acid and the like. Finally salts of diene adducts or addition products of $\alpha,\beta$-unsaturated dicarboxylic acids with unsaturated compounds as higher molecular fatty acids and as oils and fatty acids having conjugate double bonds, examples of which are terpene-maleic acids and maleic fatty acids and the like. Such diene-reaction products are known and are described in the text of C. Ellis "The Chemistry of Synthetic Resins" (1935), page 830 and the following pages, especially pages 843–847 and 857–861.

An especially important embodiment of the invention involves substantially colorless resin compositions of very good transparency prepared from ethoxylin resins and the organic salts of colorless metal ions such as aluminum, zinc, titanium and lead.

The amount of the hardening agent to be employed may be varied between wide limits depending on the nature of the resin and of the particular hardening agent used and the desired properties in the products obtained. From about 3 to 20%, especially 5 to 15% by weight in relation to the amount of the resin present usually leads to satisfactory results. Normally the resin compositions of the invention may be hardened at a temperature between 120°–200° C., the temperature to be used in any specific instance being dependent upon the type of drier used and other factors.

The heat hardenable resin compositions containing the herein defined hardening or curing agents possess the outstanding advantage of unlimited storability. Moreover, the cured resins of the invention possess excellent resistance to, and stability against solvents, outstanding elasticity, and faultless film surface, as well as advantages with regard to the curing times required. The ethoxylin resins thus cured yield protective coatings or films upon application which are outstandingly dense and free from pores, and yield cast resins consisting of completely homogeneous end products free from bubbles.

In connection with solid ethoxylin resins, the use of curing agents embodying the present invention has the further advantage that after melting in the curing agents, practically no reduction of the melting point occurs so that objectionable stickiness of the resins at summer temperatures is eliminated.

The catalysts utilized in the present invention can be fused together with the ethoxylin resins at elevated temperatures without the application of solvents. The catalyst reacts with the resin to such extent that the catalyst does not crystallize out upon cooling of the molten product and this is the effect at temperatures above 130° C. If the catalyst is used in excess, filtration of the resin after melting in the catalyst, is advisable. The above mentioned catalysts can also be dissolved in suitable solvents and added in unaltered condition to the resins or to resins which have been previously dissolved.

The process of the present invention can be used for curing ethoxylin resins of the most varied chemical structure, including those which—in addition to their ethoxylin grouping—contain still other functional groups, such as for example, phenolic or alcoholic hydroxyl groups. The process of the invention can be likewise used for mixed polymerization products of polyepoxy resins with monoepoxy compounds, such as for example glycidphenylether. The preferred resins may be defined as unmodified epoxy resins containing free epoxy groups, said resins being reaction products of polyhydroxy phenols, as the dihydroxy-diphenyl compound of Example 1 and the resorcin of Example 4 (hereinafter set forth), with chlorohydrin compounds, as dichlorohydrin and epichlorohydrin.

*Example 1*

One hundred parts by weight of an ethoxylin resin prepared in known manner from 1 mol p,p'-dihydroxy-diphenyldimethylmethane and 2 mols of 1,3-dichlorhydrine, are mixed at 150° C. with 9.2 parts by weight of lead naphthenate and kept at this temperature for five minutes after which the molten mixture is cooled to normal or room temperature. This combination of resin and catalyst, which has been prepared without a solvent, can with advantage be used as a casting resin, as well as an adhesive and cementing agent.

*Example 2*

Eighty parts by weight of an ethoxylin resin prepared in known manner from p,p'-dihydroxydiphenyldimethylmethane, are mixed at 150° C. with 6.5 parts by weight of aluminum naphthenate prepared from naphthenic acid and aluminum butylate and then dissolved in 80 parts by weight of ethyleneglycol. The resin solution is filtered at a temperature of 50°–80° C. through a pressure filter and then allowed to cool. A film prepared and baked for thirty minutes with this lacquer at 180° C. on a piece of sheet metal, is distinguished by particular hardness, gloss and absence of color.

*Example 3*

One hundred and ten parts by weight of the ethoxylin resin described in Example 1, are mixed at 140° C. with 9.8 parts by weight of cobalt resinate and dissolved and purified in a manner analogous to that described in Example 2. Due to the presence of cobalt, the product thus treated has a violet color. It is particularly suitable for the production of adhesives and cementing agents.

*Example 4*

One hundred parts by weight of an ethoxylin resin prepared in known manner from resorcin and epichlorhydrin are mixed at 140°–150° C. with 8.7 parts by weight of lead linoleate and further processed in the manner described in Example 2. Films obtained by coating and baking at 180° C. for thirty minutes, have a faint yellow color and are completely cured.

*Example 5*

One hundred parts by weight of the ethoxylin resin described in Example 1, are brought to reaction at 140° C. with 12.5 parts by weight of manganese naphthenate, dissolved in one hundred parts by weight of ethylene glycol and filtered. Films obtained by baking at 180° C. for thirty minutes have a faint brown color and are completely cured.

*Example 6*

One hundred and five parts by weight of the ethoxylin resin described in Example 1, are brought to reaction with 10.0 parts of zinc naphthenate, at 150° C. After cooling, a resin-catalyst-combination is obtained, which is particularly distinguished by its homogeneity and transparency. This composition yields, after curing, and products which are completely homogeneous and free from bubbles and they can therefore be very satisfactorily used as a casting resin and as a cementing resin.

*Example 7*

Eighty-five parts by weight of the ethoxylin resin described in Example 1, are brought to reaction at 150° C. with 6.8 parts by weight of a titanium salt of fatty acids obtained as last runnings in distillation. After purification and dissolution of the resin-catalyst-combination in known manner, a lacquer is obtained which can be completely cured at 180° C.

*Example 8*

Ninety-three parts by weight of the ethoxylin resin described in Example 4 are reacted with 7.5 parts by weight of the aluminum salt of an α-terpinene maleic acid adduct, at 140° C. and further processed in the manner described in Example 2. Films obtained by coating and baking at 180° C. for forty minutes are completely hardened.

*Example 9*

One hundred parts by weight of the ethoxylin resin described in Example 1 are mixed at 130°–150° C. with 10.5 parts by weight of lead hexanate (about 40% Pb) and kept at this temperature until a homogeneous molten product is formed. The resin-curing agent-combination thus obtained yields cast articles which are completely free from bubbles and can be very satisfactorily used as a casting resin and as an adhesive resin. Films obtained from a fifty percent ethyleneglycol solution by baking at about 200° C. for thirty minutes are distinguished by particular resistance to chemicals and mechanical influences.

It should be understood that the invention is not limited to the specific details of disclosure herein set out but that it extends to all equivalents which will occur to those skilled in the art upon consideration of the scope of the claims appended hereto. For example, other terpenes include d- and β-pinenes, dipentenes, d- and l-limonenes and terpinols.

*Example 10*

One hundred and two parts by weight of the ethoxylin resin described in Example 4 are reacted with 8.2 parts by weight of the aluminum salt of an α-eleostearic acid-maleic acid adduct at 140° C. and further processed in the manner described in Example 2. Films obtained by coating and baking at 140° C. for 35 minutes are completely hardened.

I claim:

1. A process for preparing epoxy resin compositions of improved heat hardening qualities which comprises incorporating a polyvalent metal-carboxylic acid salt drier in an unmodified epoxy resin having free epoxy groups, said resin being the reaction product of a polyhydric phenol and a compound selected from the group consisting of dichlorohydrin and epichlorohydrin.

2. A process for preparing epoxy resin compositions of improved heat hardening qualities which comprises incorporating a polyvalent metal-carboxylic acid salt drier, the metal of which is selected from the group consisting of calcium, aluminum, zinc, manganese, cobalt, copper and lead, in an unmodified epoxy resin having free epoxy groups, said resin being the reaction product of a polyhydric phenol and a compound selected from the group consisting of dichlorohydrin and epichlorohydrin.

3. A process for preparing epoxy resin compositions of improved heat hardening qualities which comprises, incorporating a polyvalent metal-carboxylic acid salt drier, the metal of which is selected from the group consisting of calcium, aluminum, zinc, manganese, cobalt, copper and lead, and the organic component of which is a higher molecular weight carboxylic acid radical, in an unmodified epoxy resin having free epoxy groups, said resin being the reaction product of a polyhydric phenol and a compound selected from the group consisting of dichlorohydrin and epichlorohydrin.

4. A process for preparing epoxy resin compositions of improved heat hardening qualities which comprises incorporating 3 to 20% of a polyvalent metal-carboxylic acid salt drier, the metal of which is selected from the group consisting of calcium, aluminum, zinc, cobalt, manganese, copper, and lead, and the organic component of which is selected from the group consisting of diene reaction products of terpenes and α,β-unsaturated dicarboxylic acids, in an unmodified epoxy resin having free epoxy groups, said resin being the reaction product of a polyhydric phenol and a compound selected from the group consisting of dichlorohydrin and epichlorohydrin.

5. A process for preparing epoxy resin compositions of improved heat hardening qualities which comprises incorporating 3 to 20% of a polyvalent metal-carboxylic acid salt drier, the metal of which is selected from the group consisting of calcium, aluminum, zinc, cobalt, manganese, copper and lead, and the organic component of which is selected from the group consisting of diene reaction products of oils and fatty acids having conjugate double bonds and α,β-unsaturated dicarboxylic acids, in an unmodified epoxy resin having free epoxy groups, said resin being the reaction product of a polyhydric phenol and a compound selected from the group consisting of dichlorohydrin and epichlorohydrin.

6. A process for hardening an unmodified epoxy resin having free epoxy groups, said resin being the reaction product of a polyhydric phenol and a compound selected from the group consisting of dichlorohydrin and epichlorohydrin which comprises incorporating in the resin in a heat hardenable state 3 to 20% of a polyvalent metal-carboxylic acid salt drier, and heating the resulting mixture to harden the same.

7. An unmodified epoxy resin having free epoxy groups, said resin being the reaction product of a polyhydric phenol and a compound selected from the group consisting of dichlorohydrin and epichlorohydrin containing as a heat hardening agent 3 to 20% of a polyvalent metal-carboxylic acid salt drier.

8. An unmodified epoxy resin having free epoxy groups, said resin being the reaction product of a polyhydric phenol and a compound selected from the group consisting of dichlorohydrin and epichlorohydrin containing as a heat hardening agent 3 to 20% of a polyvalent metal-carboxylic acid salt drier, the metal of which is selected from the group consisting of calcium, aluminum, zinc, cobalt, manganese, copper, and lead.

9. An unmodified epoxy resin having free epoxy groups, said resin being the reaction product of a polyhydric phenol and a compound selected from the group consisting of dichlorohydrin and epichlorohydrin containing as a heat hardening agent 3 to 20% of a polyvalent metal-carboxylic acid salt drier, the organic component of which is a higher molecular weight carboxylic acid radical.

10. An unmodified epoxy resin having free epoxy groups, said resin being the reaction product of a polyhydric phenol and a compound selected from the group consisting of dichlorohydrin and epichlorohydrin containing as a heat hardening agent 3 to 20% of a polyvalent metal-carboxylic acid salt drier, the metal of which is selected from the group consisting of calcium, aluminum, zinc, cobalt, manganese, copper and lead, and the organic component of which is selected from the group consisting of diene reaction products of terpenes with $\alpha,\beta$-unsaturated dicarboxylic acids.

11. An unmodified epoxy resin having free epoxy groups, said resin being the reaction product of a polyhydric phenol and a compound selected from the group consisting of dichlorohydrin and epichlorohydrin containing as a heat hardening agent 3 to 20% of a polyvalent metal-carboxylic acid salt drier, the metal of which is selected from the group consisting of calcium, aluminum, zinc, cobalt, manganese, copper and lead, and the organic component of which is selected from the group consisting of diene reaction products of oils and fatty acids having conjugate double bonds with alpha,beta-unsaturated dicarboxylic acids.

12. An unmodified epoxy resin having free epoxy groups, said resin being the reaction product of a polyhydric phenol and a compound selected from the group consisting of dichlorohydrin and epichlorohydrin containing as a heat hardening agent 3 to 20% of a polyvalent metal-carboxylic acid salt drier, the organic component of which is a naphthenic acid radical.

13. An unmodified epoxy resin having free epoxy groups, said resin being the reaction product of a polyhydric phenol and a compound selected from the group consisting of dichlorohydrin and epichlorohydrin containing as a heat hardening agent 3 to 20% of a polyvalent metal-carboxylic acid salt drier, the metal of which is selected from the group consisting of calcium, aluminum, zinc, cobalt, manganese, copper and lead and the organic component of which is a napthenic acid radical.

14. An unmodified epoxy resin having free epoxy groups, said resin being the reaction product of a polyhydric phenol and a compound selected from the group consisting of dichlorohydrin and epichlorohydrin containing as a heat hardening agent a polyvalent metal-carboxylic acid salt drier, the organic component of which is composed of synthetic fatty acid radicals obtained by the oxidation of paraffin.

15. An unmodified epoxy resin having free epoxy groups, said resin being the reaction product of a polyhydric phenol and a compound selected from the group consisting of dichlorohydrin and epichlorohydrin containing as a heat hardening agent a polyvalent melta-carboxylic acid salt drier, the organic component of which is a natural resin acid radical.

16. An unmodified epoxy resin having free epoxy groups, said resin being the reaction product of a polyhydric phenol and a compound selected from the group consisting of dichlorohydrin and epichlorohydrin containing as a heat hardening agent a polyvalent metal-carboxylic acid salt drier, the organic component of which is a radical of an $\alpha,\beta$-unsaturated dicarboxylic acid-unsaturated fatty acid addition product.

17. An unmodified epoxy resin having free epoxy groups, said resin being the reaction product of a polyhydric phenol and a compound selected from the group consisting of dichlorohydrin and epichlorohydrin containing as a heat hardening agent a polyvalent metal-carboxylic acid salt drier, the organic component of which is a radical of a maleic acid-unsaturated fatty acid addition product.

18. An unmodified epoxy resin having free epoxy groups, said resin being the reaction product of a polyhydric phenol and a compound selected from the group consisting of dichlorohydrin and epichlorohydrin containing as a heat hardening agent a polyvalent metal-carboxylic acid salt drier, the organic component of which is a radical of a terpene-$\alpha,\beta$-unsaturated dicarboxylic acid reaction product.

19. An unmodified epoxy resin having free epoxy groups, said resin being the reaction product of a polyhydric phenol and a compound selected from the group consisting of dichlorohydrin and epichlorohydrin containing as a heat hardening agent a polyvalent metal-carboxylic acid salt drier, the organic component of which is a radical of a terpene-maleic acid reaction product.

20. Solvent - resistant, elastic, dense, homogeneous epoxy resin composition comprising the heat hardened reaction product of an unmodified epoxy resin having free epoxy groups, said resin being the reaction product of a polyhydric phenol and a compound selected from the group consisting of dichlorohydrin and epichlorohydrin with a polyvalent metal-carboxylic acid salt drier.

21. Solvent - resistant, elastic, dense, homogeneous epoxy resin composition comprising the heat hardened reaction product of an unmodified epoxy resin of a compound selected from the group consisting of p,p'-dihydroxy-diphenol-dimethylmethane and resorcinol with a compound selected from the group consisting of epichlorhydrin and dichlorhydrin with a polyvalent metal-carboxylic acid salt drier.

References Cited in the file of this patent

UNITED STATES PATENTS

| | | |
|---|---|---|
| 2,493,486 | Greenlee | Jan. 3, 1950 |
| 2,500,765 | Montague | Mar. 14, 1950 |
| 2,575,440 | Bradley | Nov. 20, 1951 |
| 2,596,737 | Tess | May 13, 1952 |
| 2,637,621 | Auer | May 5, 1953 |

FOREIGN PATENTS

| | | |
|---|---|---|
| 511,927 | Belgium | June 30, 1952 |

OTHER REFERENCES

Epon: Paint, Oil and Chemical Review, vol. 113, No. 23, pages 15–18, 48 and 49, November 9, 1950.